United States Patent [19]
Kellogg

[11] Patent Number: 5,596,553
[45] Date of Patent: Jan. 21, 1997

[54] DIGITAL SUNDIAL

[76] Inventor: Robert L. Kellogg, 7509 Dew Wood Dr., Rockville, Md. 20855

[21] Appl. No.: 561,454

[22] Filed: Nov. 21, 1995

[51] Int. Cl.⁶ ............... G04B 49/00; G04C 19/00; G01C 17/34
[52] U.S. Cl. ............... 368/79; 368/82; 368/223; 368/239; 33/270
[58] Field of Search ............... 368/79, 82–84, 368/223, 239–242; 33/269–270

[56] References Cited

U.S. PATENT DOCUMENTS

| | | | |
|---|---|---|---|
| 2,931,102 | 4/1960 | Thew | 33/270 |
| 4,225,864 | 3/1981 | Glenoinning | 33/270 |
| 4,279,031 | 7/1981 | Dostoomian | 368/82 |
| 4,387,999 | 6/1983 | Shelley | 368/15 |
| 4,782,472 | 11/1988 | Hines | 368/15 |

OTHER PUBLICATIONS

Boon, "Digital Sundial–Solar Clock", © 1981.

*Primary Examiner*—Vit W. Miska
*Attorney, Agent, or Firm*—Fitzpatrick, Cella, Harper & Scinto

[57] ABSTRACT

A sundial gnomon including a first surface having a plurality of parallel first surface apertures transmissive to light and through which a plurality of sunbeams pass, and a second surface having a plurality of second surface segment apertures for regulating the passage of sunbeams passing through the plurality of first surface apertures. The plurality of second surface segment apertures are arranged in a plurality of stencil patterns, each stencil pattern including a plurality of second surface segment apertures. The plurality of second surface segment apertures are configured to cause sunbeams passing through the plurality of first surface apertures to be incident upon second surface segment apertures of only one stencil pattern at a given time. Thus, sunbeams passing through the two surfaces will display the hour of the day. Preferably, the gnomon includes a second set of surfaces having apertures therein through which sunbeams pass to respectively display portions of an hour such as 10 minute intervals.

21 Claims, 12 Drawing Sheets

DIGITAL SUNDIAL

BACKGROUND OF THE INVENTION

1. Field of the Invention

This invention relates to a digital sundial (also referred to as a solar clock), and more particularly, to a digital sundial including one or more gnomon bodies, each comprising a plurality of stylus slits and segmented element openings for casting horological silhouettes.

2. Description of the Related Art

Sundial gnomons have employed a single stylus to cast sunlight or shadows onto a ruled dial or marked display surface, thereby showing the continuous passage of solar time. Modern improvements and refinements to sundials use gnomons comprising a plurality of styli to mark the passage of solar time.

U.S. Pat. No. 2,931,102 (Thew) shows a sundial with an arcuate band-like gnomon having perforations in the shape of horological marks, wherein the shadow of opaque or solid portions of the gnomon is cast onto a central shadow receiving area to display arabic symbols representing the hours of the day.

U.S. Pat. No. 4,387,999 (Shelley) discusses an electronic sundial apparatus having concentric hemispheres, each having a plurality of slits. The slits of the hemispheres function in conjunction to collimate sunlight once each hour at the concentric radial center of the hemispheres, where an electronic detector is located.

U.S. Pat. No. 4,782,472 (Hines) shows a solar clock with a digital time display. A cylindrical opaque mask member is provided with a series of sunlight-transmitting apertures which cooperate with a plurality of strategically positioned fiber optic arrays, coupled to a light-responsive digital display to provide a discrete indication of the solar time.

A digital sundial is shown in a pamphlet © 1981 by Boon. The pamphlet states that slits "produce two inch high illuminated Roman numerals as the sun's rays pass over coded patterns of light and dark."

However, a need remains for a sundial gnomon to not only directly and precisely cast the sun's rays as digital numbers or horological silhouettes, but also to repetitively display horological symbols at successive periods to indicate common hourly intervals, such as the quarter hour or each ten minute interval thereof.

SUMMARY OF THE INVENTION

In view of the foregoing, an object of this invention is to provide a digital sundial or solar clock to directly and discretely cast successive horological silhouettes onto an unruled and unmarked dial display surface in response to the diurnal motion of the sun, in a common, recognizable form which clearly and precisely marks successive periods of solar time.

According to one aspect of the present invention, a sundial gnomon comprises a first surface having a plurality of parallel first surface apertures transmissive to light and through which a plurality of sunbeams pass. A second surface is provided and has a plurality of second surface segment apertures for regulating the passage of sunbeams passing through the plurality of first surface apertures. The plurality of second surface segment apertures is arranged in a plurality of patterns, each pattern including a plurality of second surface segment apertures. The plurality of second surface segment apertures is configured to cause sunbeams passing through the plurality of first surface apertures to be incident upon second surface segment apertures of only one pattern (for example, an hour display) at a given time.

According to a further aspect of the present invention, a sundial gnomon comprises a first surface having a plurality of parallel apertures transmissive to light and through which sunlight passes. A second surface is provided which receives sunlight from the first surface apertures, the second surface having at least two patterns of parallel aperture elements regulating passage of sunlight, a first pattern including a plurality of second surface aperture elements which form a pattern illuminated during only one period of a day and which are configured in accordance with the law of tangents. A second pattern includes a further plurality of second surface aperture elements which form a pattern illuminated repetitively by successive first surface apertures and which are configured in accordance with a modified linear small angle approximation to the law of tangents, the modification including application of a scaling factor for Chebychev error equalization.

According to yet another aspect of the present invention, a sundial comprises collimating means for collimating incident sunlight into a plurality of light beams. Light-beam-pattern-creating means are provided for transforming light beams from said collimating means to create a light beam pattern including at least one first pattern displayed only for a single period of time during the course of a day and at least one second pattern repetitively displayed during a respective plurality of periods during the course of a day. The light-beam-pattern-creating means comprises a plurality of parallel slits.

According to a further aspect of the present invention, a sundial comprises at least one gnomon body including an opaque grill surface and an opaque regulating surface. The opaque grill surface has a plurality of grill surface apertures transparent to light and through which sunlight passes. The opaque regulating surface is parallel to the grill surface and receives sunlight passing through the plurality of grill surface apertures. The regulating surface has a plurality of regulating surface apertures transparent to light, the plurality of regulating surface apertures including (i) at least one first pattern including a plurality of regulating surface apertures arranged in accordance with the law of tangents with respect to the plurality of grill surface apertures to pass sunlight passed from the grill surface to create a light pattern to be displayed only during a single period during the course of a day, and (ii) at least one second pattern including a plurality of regulating surface apertures arranged in accordance with a modified linear approximation to the law of tangents with respect to the plurality of grill surface apertures. The linear approximation includes the law of small angles, and the modification includes application of a scaling factor with the law of small angles modified by a scaling factor in accordance with Chebychev error equalization to create a light pattern to be repetitively displayed during a corresponding plurality of periods during the course of the day.

The foregoing and other objects, advantages, and features of the present invention will become more apparent from the following detailed description of the preferred embodiments taken in conjunction with the accompanying drawings.

DETAILED DESCRIPTION OF THE PREFERRED EMBODIMENTS

Figure 1:
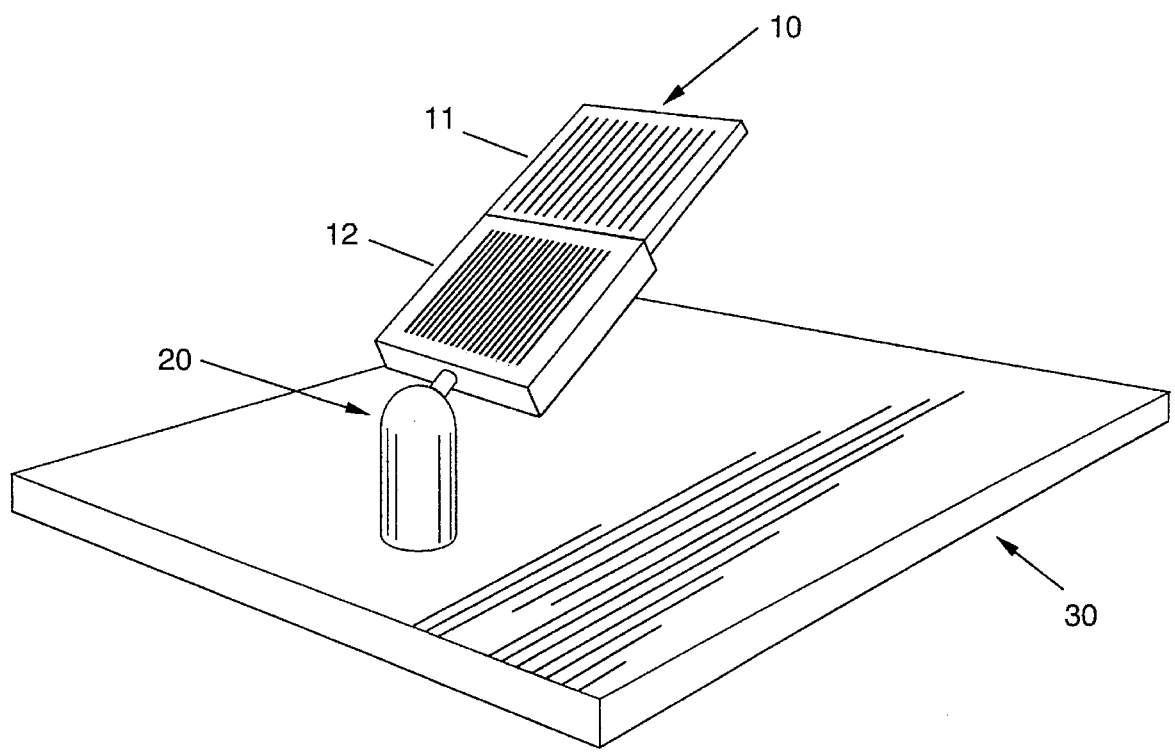
FIG. 1 is a perspective view of a basic configuration of a digital sundial in accordance with a first embodiment of the invention.

A first embodiment of the digital sundial or solar clock is depicted in FIG. 1. The digital sundial comprises a gnomon body 10, supported by a support element 20, and an unruled display element 30. Sunlight incident upon the gnomon body 10 causes the gnomon body 10 to cast a horological symbol or numeral silhouettes in a singular and successive manner upon the unruled display element 30.

Figure 2:
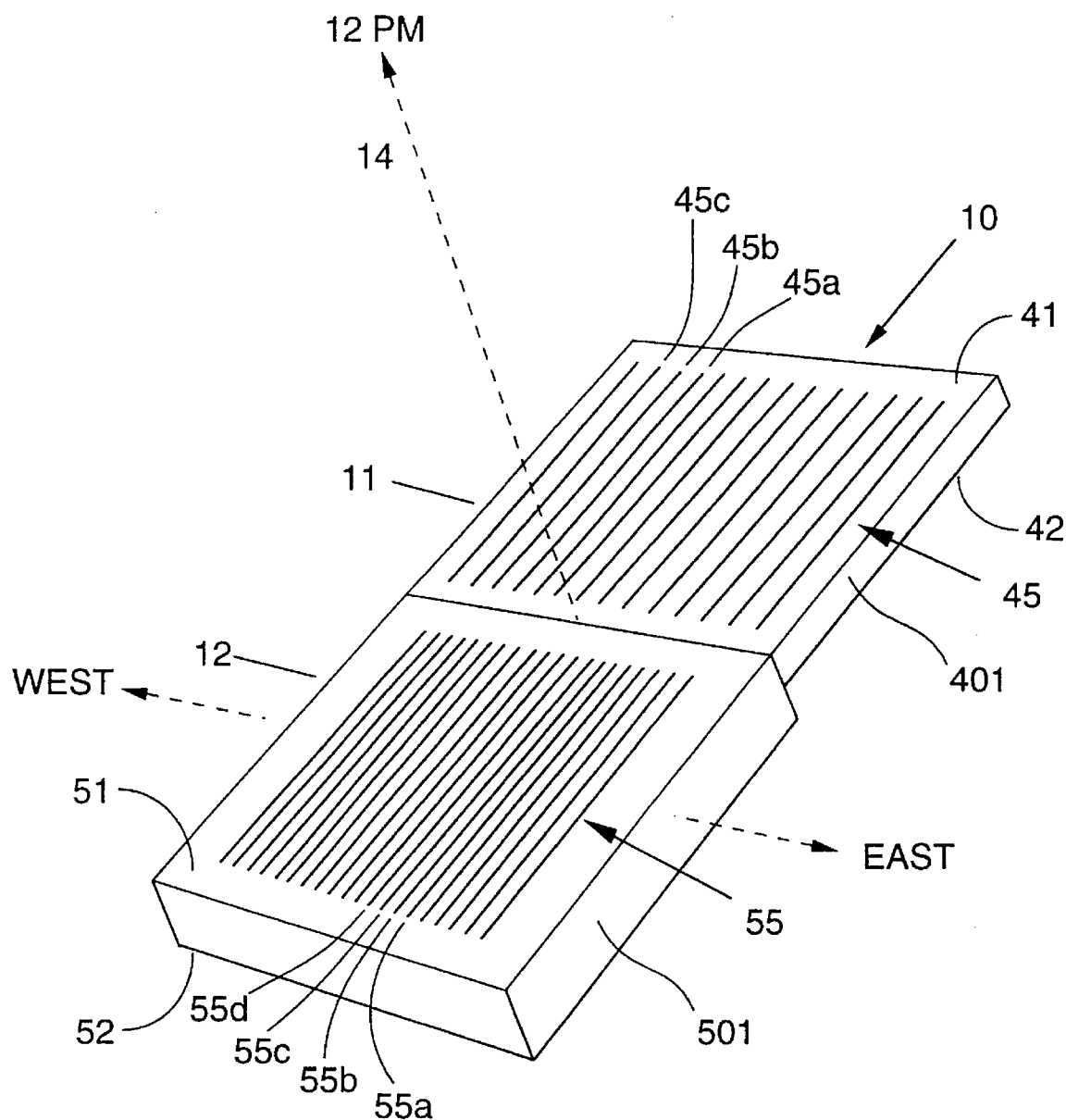
FIG. 2 is a perspective view of the gnomon body of the digital sundial shown in FIG. 1.

As illustrated in FIGS. 1 and 2, the gnomon body 10 comprises an hourly panel section 11 and a common interval (e.g., 10 minute interval) panel section 12, which are panels arranged on parallel planes. The hourly panel section 11 regulates sunlight for the casting, onto the unruled display element 30, of a non-repetitive horological symbol or numeral silhouettes such as hourly intervals, i.e., for display during only a single period of time during a day. The common interval panel section 12 regulates sunlight for the repetitive casting, onto the unruled display element 30, of a horological symbol or numeral silhouettes at periodic intervals such as 10 minute intervals, i.e., for display during more than one period per day. The hourly panel section 11 depicted in FIG. 1 is designed to cast four successive silhouettes at hourly intervals over a corresponding time domain of four hours, although a longer time domain could be realized by extending the gnomon or providing multiple gnomons (to be discussed below). The common interval panel section 12 preferably casts six successive silhouettes marking respective ten minute intervals (e.g., "00", "10", "20", "30", "40", and "50") which collectively repeat during every hour over the time domain. The time domain, the division of the time domain into non-repetitive (e.g., hourly) and repetitive (e.g., common interval) intervals, and the period of casting horological silhouettes between intervals are entirely selectable. For example, the time domain could encompass five hours and the hourly panel section 11 could instead cast five successive silhouettes at hourly intervals and the common interval panel section 12 could instead cast four successive silhouettes marking 15 minute intervals (e.g., "00", "15", "30", and "45"), or any other regular or irregular intervals.

The principal axis of the gnomon body 10, illustrated as dashed line 14 in FIG. 2, comprises a vector perpendicular to the surface of the hourly and common interval panel sections 11 and 12. The principal axis 14 is directed toward a point on the celestial equator which meets the middle solar hour angle of the designated time domain of the gnomon body. When using a gnomon body 10 whose time domain consists of the four hour interval from 10 o'clock AM to 2 o'clock PM local solar time, for example, the orientation of the principal axis 14 corresponds to the direction of the intersection of the celestial equator and the local noon meridian.

As shown in FIG. 2, the hourly panel section 11 comprises a sunward stylus surface layer element 41 and an opposing stencil surface layer element 42, whilst common interval panel section 12 comprises a sunward stylus surface layer element 51 and an opposing stencil surface layer element 52. Between sunward stylus surface layer element 41 and opposing stencil surface layer element 42 is disposed gnomon body material 401. Between sunward stylus surface layer element 51 and opposing stencil surface layer element 52, is disposed gnomon body material 501. Gnomon body material 401 and 501 each preferably comprises a clear rigid material such as acrylic, glass, or another substantially clear material with an index of refraction greater than one. Alternatively, the hourly panel section 11 and common interval panel section 12 may each be hollow. In that case, the surface layer elements of each of the panel sections 11 and 12 are connected by supports, with a gap between the surface layer elements.

In preferred form, sunward stylus surface layer elements 41 and 51, and opposing stencil surface elements 42 and 52 each comprise an opaque material such as metal or electroplate, ink, paint, adhered film, or any other opaque material which may be provided with transparent openings by etching, cutting, milling, ruling, printing, burning, or any other method which allows certain and specific portions of the surface layer to be made transparent and transmissive to sunlight. For example, the surface layer elements may each comprise an acrylic panel with patterns of opaque and non-opaque areas thereon. Instead of employing a pair of panels with transmissive apertures thereon, a single transmissive block with patterns provided on opposing sides may be employed.

Figure 3:
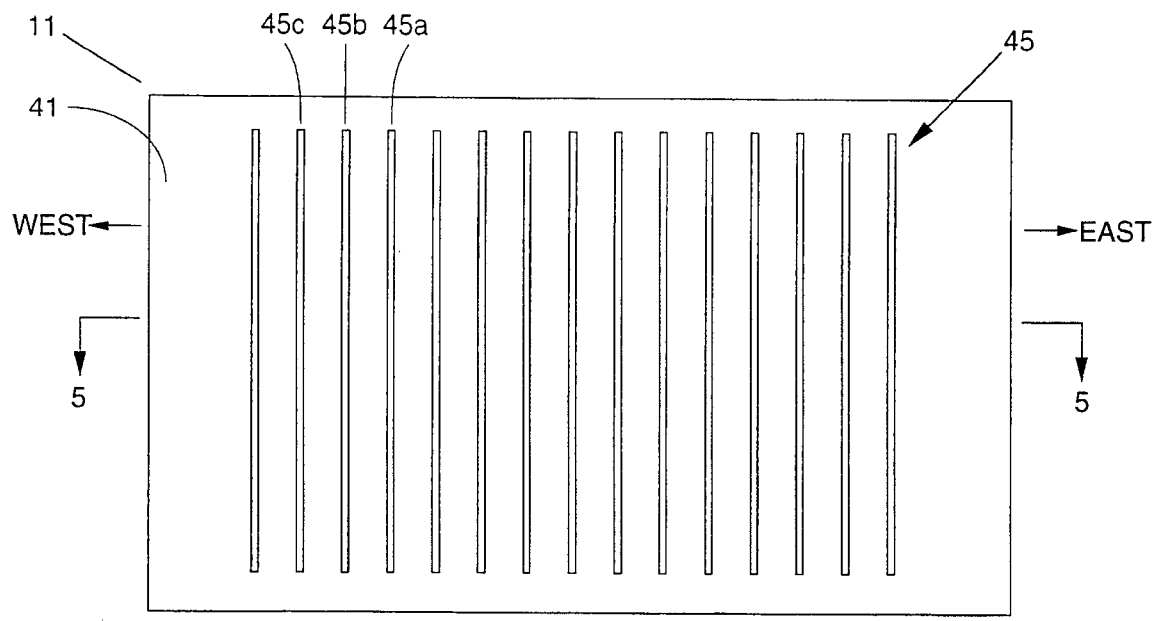
FIG. 3 is a plan view of the sunward stylus surface layer element of the hourly section panel of the gnomon body of FIG. 2.

As shown in FIGS. 2 and 3, the sunward stylus surface layer element 41 of the hourly panel section 11 is provided with a plurality of parallel light-transmissive aperture openings, of equal size and spacing, referred to as apertures or stylus slits 45. Three of these stylus slits, for purposes of discussion, have been labeled 45a, 45b, and 45c in FIGS. 2, 3, and 5a–5d. Sunlight incident upon the sunward stylus surface layer element 41 passes through the stylus slits 45, and creates a plurality of sunlight beams, each having a width (neglecting penumbral effects) which is approximately the size of the stylus slit. A plurality of sunlight beams are therefore incident upon the opposing stencil surface layer element 42 of the hourly panel section 11.

Figure 4:
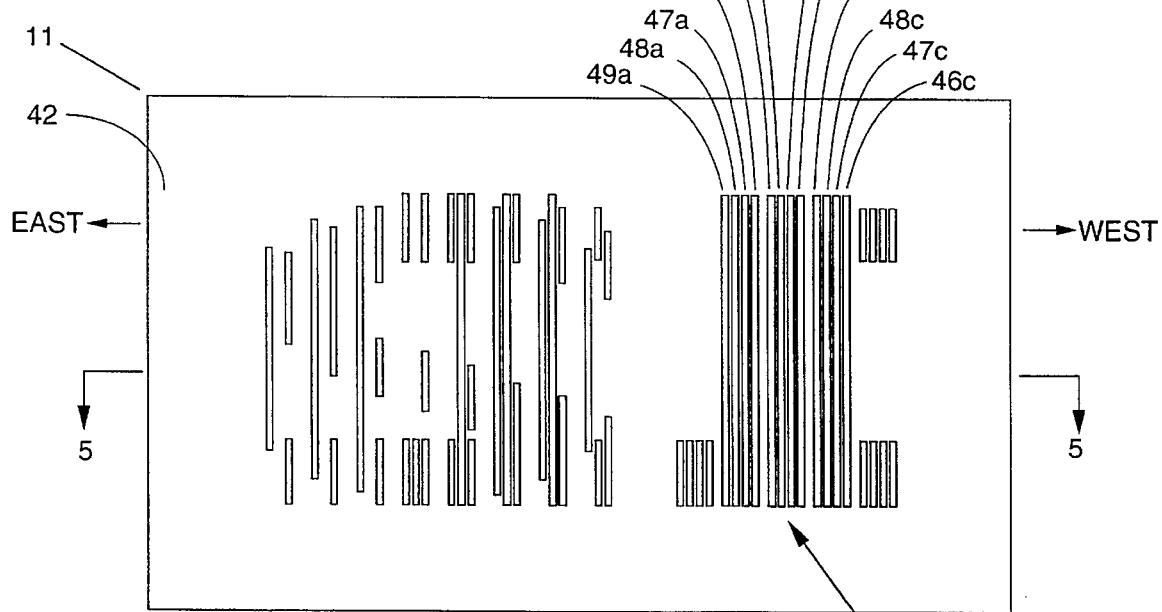
FIG. 4 is a plan view of the opposing stencil surface layer element of the hourly section panel of the gnomon body of FIG. 2.
Figure 6:
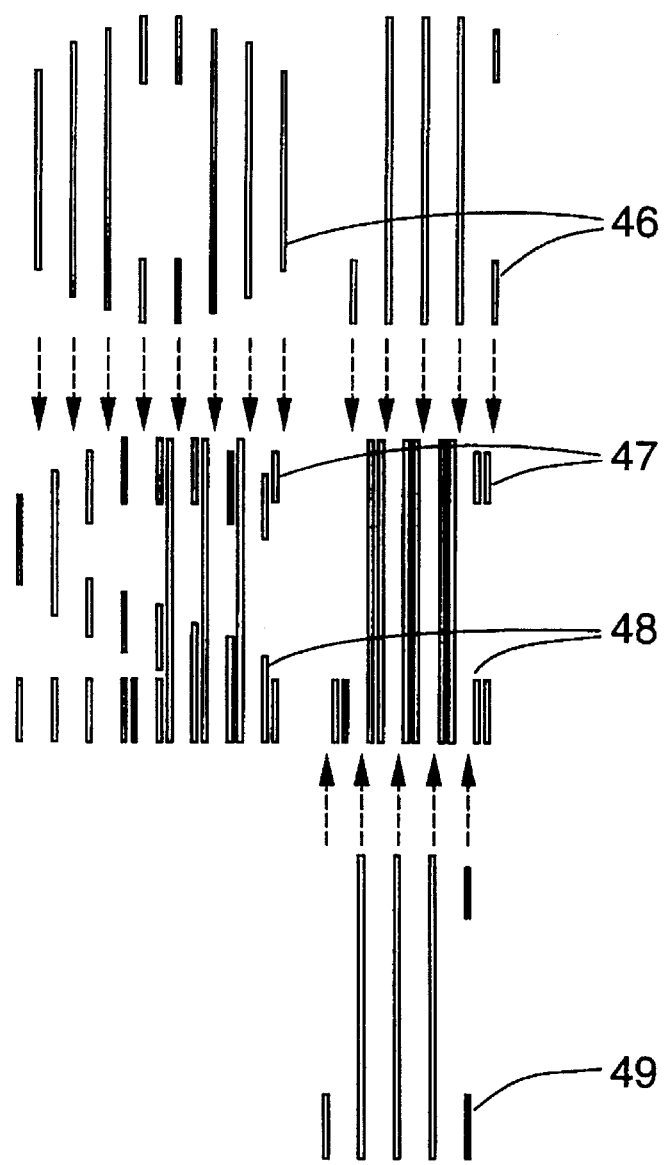
FIG. 6 is a schematic and exploded view of the stencil surface layer element of the hourly section panel of the gnomon body of FIG. 2.

As shown in FIG. 4 and diagrammatically in exploded view in FIG. 6, the stencil surface layer element 42 of the hourly panel section 11 is provided with a plurality of stencil segment element openings indicated generally by 245. As shown in FIG. 6, these openings 245 are arranged in ordered horological stencil sets 46, 47, 48, and 49 respectively representing the hourly symbols "10", "11", "12" and "1" of the gnomon body time domain. As can be seen from FIG. 6, horological stencil sets 46 through 49 are interleaved. Each horological stencil set 46 through 49 comprises a plurality of stencil segment element openings. The stencil segment element openings are not limited to apertures passing through the stencil surface layer element 42, but may instead be non-opaque areas comprising any light transmissive material, which may be in whole or in part transparent or translucent.

FIGS. 5a–5d are cross sectional views of the hourly panel section 11 at successive hourly intervals. Stencil segment element openings from each horological stencil set 46 through 49 are symmetrically aligned east–west on the opposing stencil surface element layer 42 with respect to cooperative stylus slits of the stylus surface element layer 41. Illustrated are stencil segment elements 46a–46c, 47a–47c, 48a–48c, and 49a–49c from the respective successive horological stencil sets 46, 47, 48, and 49, and stylus slits 45a–45c.

Figure 5A:
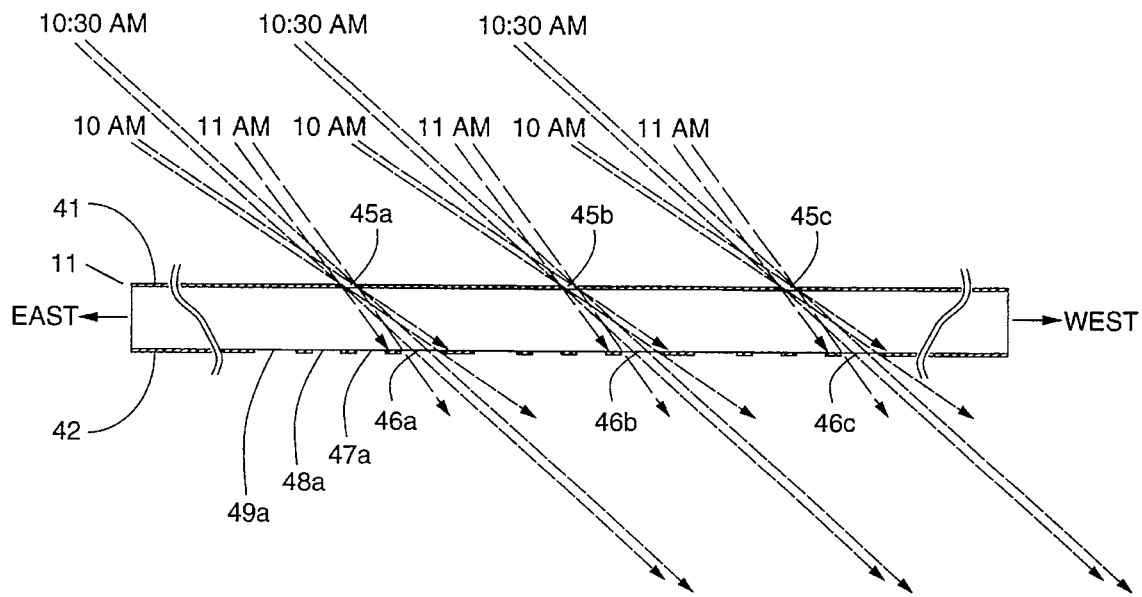
FIGS. 5a, 5b, 5c, and 5d are cross sectional views of the hourly section panel taken along the line 5—5 indicated in FIG. 3 and FIG. 4.
Figure 5B:
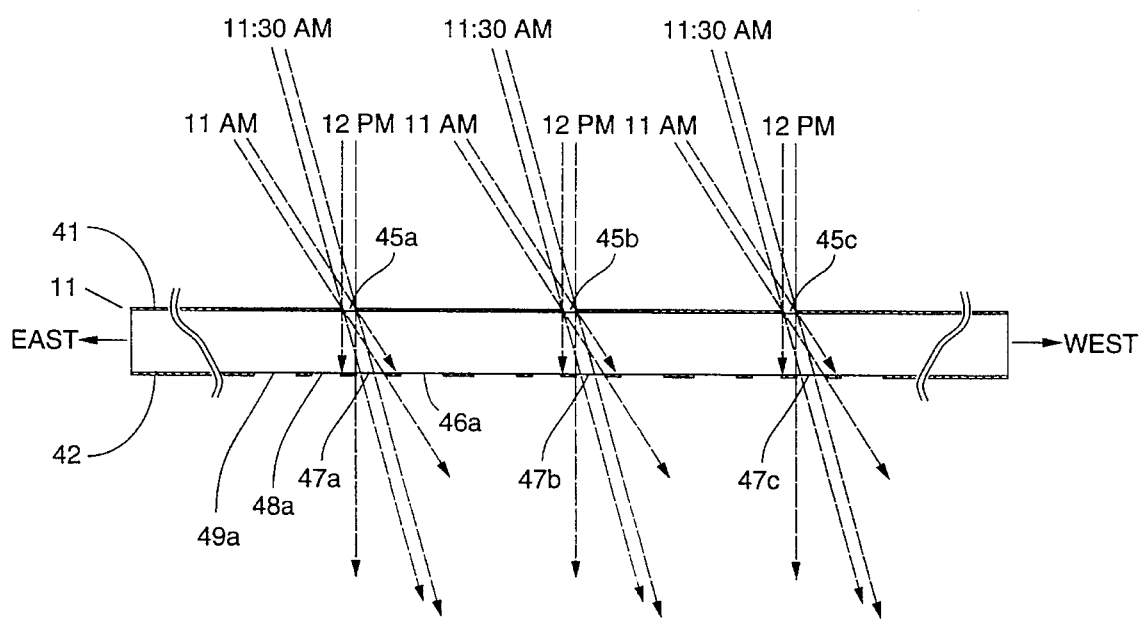
Figure 5C:
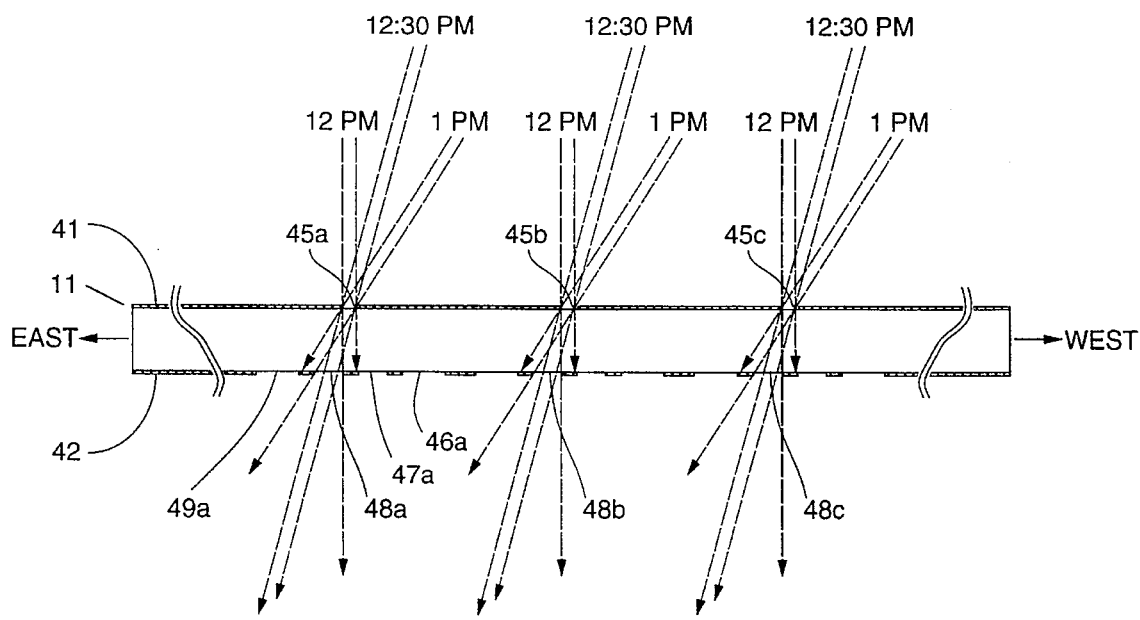
Figure 5D:
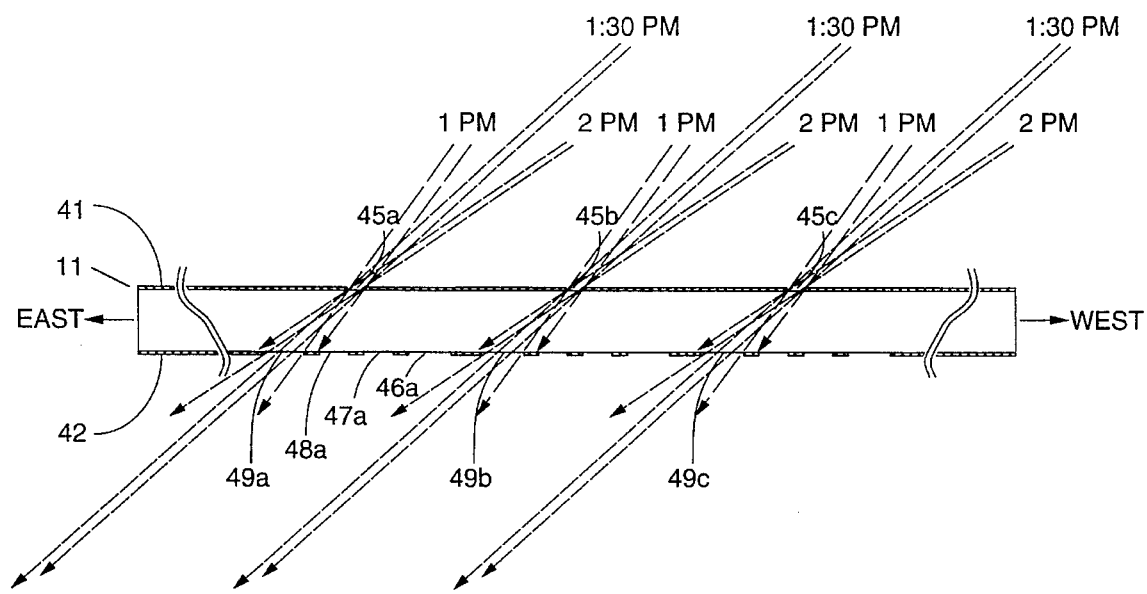

FIGS. 5a–5d show that the positioning and width of stencil segment element openings for particular hourly intervals are determined by the tangent of the angle of sunbeams relative to the gnomon body principal axis cast from cooperative stylus slits at extreme moments of the hourly interval, i.e., "in accordance with the law of tangents." That is to say, the western edge of a stencil segment element opening receives the first ray of a stylus slit-cast sunbeam of an hourly interval, and the eastern edge of the stencil segment element opening receives the last ray of the stylus slit-cast sunbeam of the hourly interval. For example, as shown in FIG. 5a, the western edge of stencil segment element opening 46a receives the first ray of a sunbeam cast by a cooperating stylus slit, i.e., stylus slit 45a. The eastern edge of stencil segment element opening 46a receives the last ray of a sunbeam cast by stylus slit 45a during the hourly interval. As a result, stencil segment element opening 46a is illuminated by sunbeams passing through stylus slit 45a throughout a one hour period (in this example, 10 AM to 11 AM). Stencil segment element openings 46b and 46c are also arranged in accordance with the law of tangents with respect to cooperating stylus slits 45b and 45c respectively, and are also illuminated during the same one hour period, as shown in FIG. 5a. FIGS. 5b–5d respectively depict the cooperation of stylus slits 45a–45c with stencil segment element openings 47a–47c, 48a–48c, and 49a–49c, respectively, also all "in accordance with the law of tangents."

Thus, it can be seen that each stencil segment element opening of a given horological stencil set is positioned with similar angular aspect to its respective cooperating stylus, and collectively, the styli cooperate with stencil segment element openings of only one horological stencil set at a time. In addition, the positions of the stencil segment element openings can be determined uniquely and precisely for each hourly or other desired time interval. Furthermore, there is a maximum stylus width and minimum distance between styli of the surface layer to ensure unique cooperation between a given stylus and the plurality of stencil segment element openings from successive horological sets during the gnomon body time domain. These relations can be derived from the law of tangents and, for a gnomon body with an index of refraction greater than one, from Snell's law of refraction. It is to be understood that the law of refraction decreases the solar angle within the gnomon body and thereby decreases the size and extent of the stencil segment element openings and correspondingly reduces the uniform spacing between surface layer stylus slits.

Figure 13:
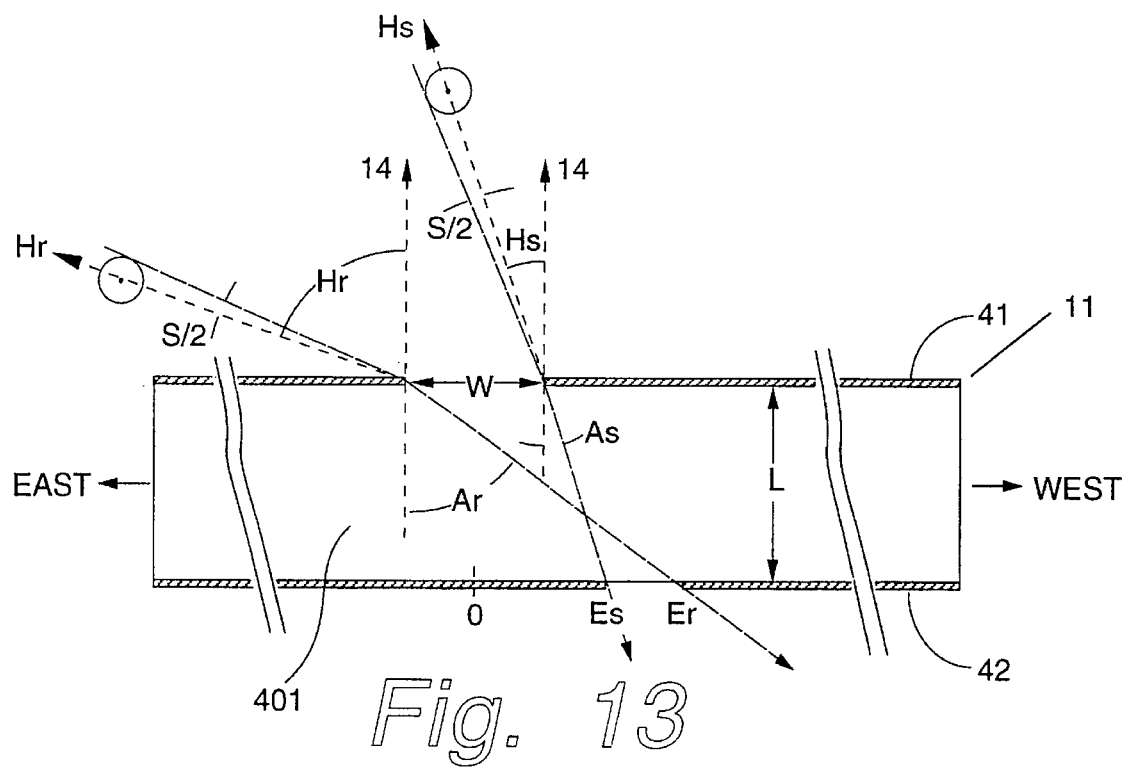
FIG. 13 is a schematic cross-sectional view of the hourly panel section of the gnomon body of FIG. 2.

The statement that the stencil segment element openings and stylus slits are arranged "in accordance with the law of tangents" may further be understood with reference to FIG. 13, and the following formulae:

The Tangential Equations for determining the position of the stencil segment element openings Let $Hr$=Hour Angle of Sun with respect to the gnomon body principal axis for the first sunbeam to pass through the stencil segment element $Hs$=Hour Angle of Sun with respect to the gnomon body principal axis for the last sunbeam to pass through the stencil segment element $S$=Angular Diameter of Sun $W$=Stylus slit width $L$=Separation distance between sunward stylus surface layer element 41 and stencil surface layer element 42

$U$=1/index of refraction of gnomon body material 401

The position of the stencil segment element opening (sunbeam rise and set edges) is determined in a coordinate system coincident with the center of the cooperative stylus slit. To compensate for refraction and direction of the sunbeam through the sundial, the interior sunbeam angles with respect to the gnomon body principal axis for sunlight rising and setting through the stencil segment element are:

$$Ar = -\arcsin(U \cdot \sin(Hr+S/2)) \text{ (rising angle)}$$

$$As = -\arcsin(U \cdot \sin(Hs-S/2)) \text{ (setting angle)}$$

The stencil segment element opening size, defined by the position of rising and setting edge for hour angles Hr and Hs, is given by:

$$Er = L \cdot \tan(Ar) - W/2 \text{ (rising edge)}$$

$$Es = L \cdot \tan(As) + W/2 \text{ (setting edge)}$$

Figure 7:
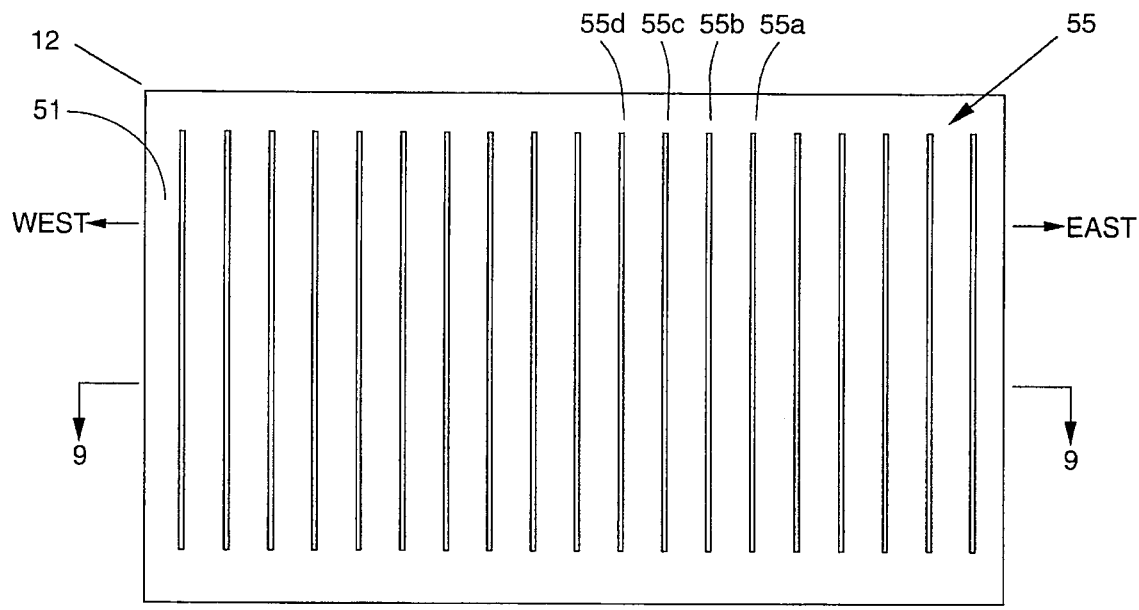
FIG. 7 is a plan view of the sunward stylus surface layer element of the common interval section panel of the gnomon body of FIG. 2.
Figure 8:
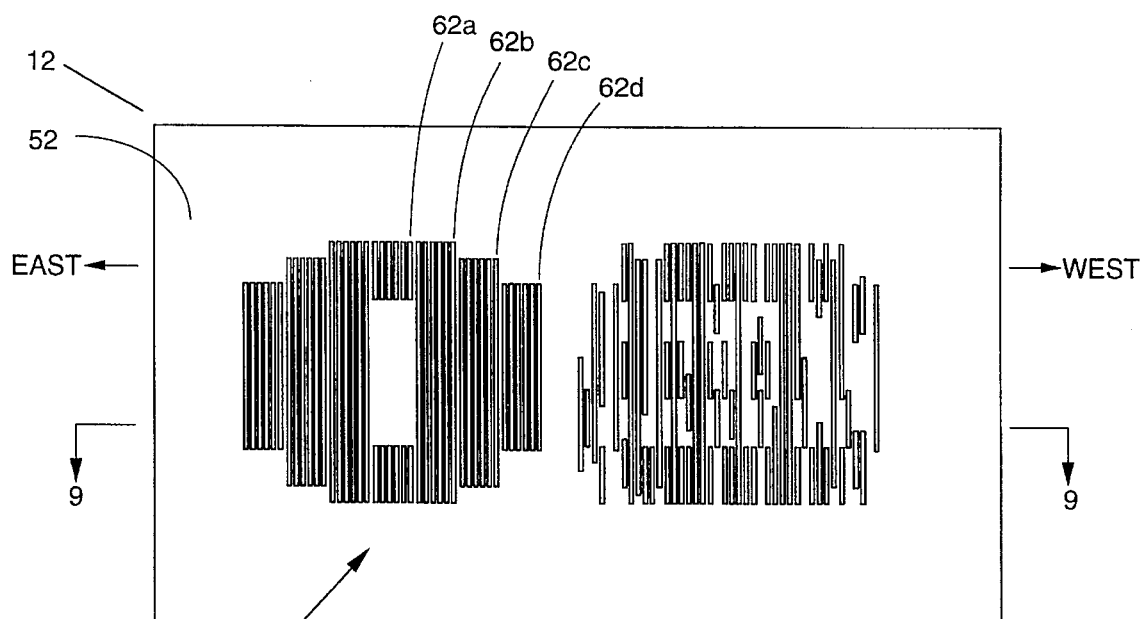
FIG. 8 is a plan view of the opposing stencil surface layer element of the common interval section panel of the gnomon body of FIG. 2.

As shown in FIGS. 2 and 7, the sunward stylus surface layer element 51 of the common interval panel section 12 is provided with a plurality of parallel transmissive aperture openings or stylus slits 55 of equal size and spacing in a manner similar to the sunward stylus surface layer element 41 of the hourly panel section 11. Four exemplary slits are labeled as 55a–55d. As shown in FIG. 8 and diagrammatically in exploded view in FIG. 10, the opposing stencil surface layer element 52 of the common interval panel section 12 is provided with a plurality of stencil segment element openings, generally shown as 255 and arranged in ordered horological stencil segment sets 60–65 respectively representing the ten minute symbols "00", "10", "20", "30", "40", and "50" which subdivide the hourly time into corresponding ten minute intervals.

Figure 9A:
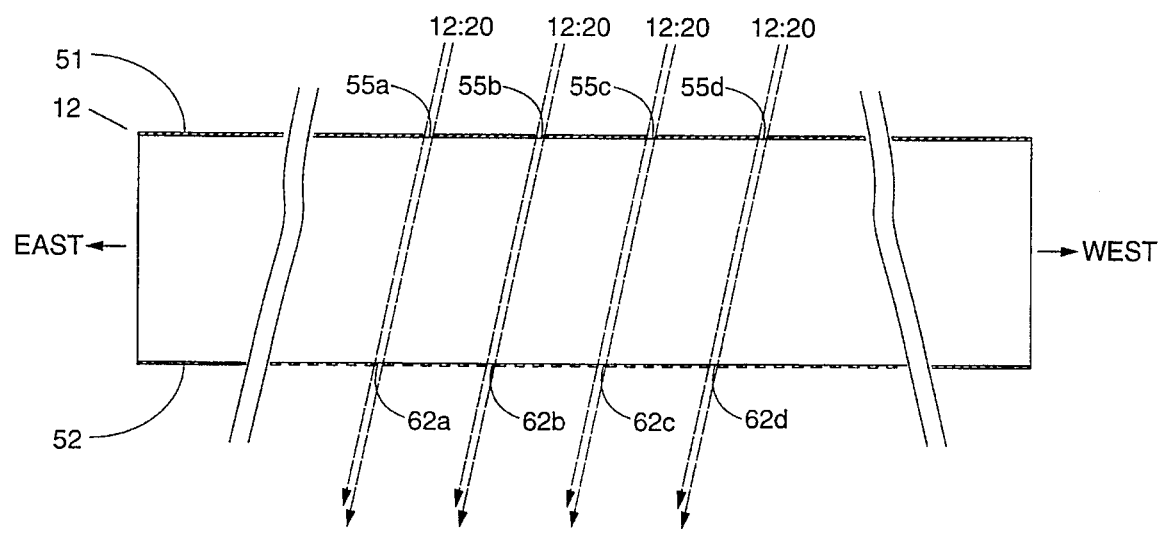
FIGS. 9(a) and 9(b) are cross sectional views of the common interval section panel taken upon the line 9—9 indicated in FIG. 7 and FIG. 8.
Figure 9B:
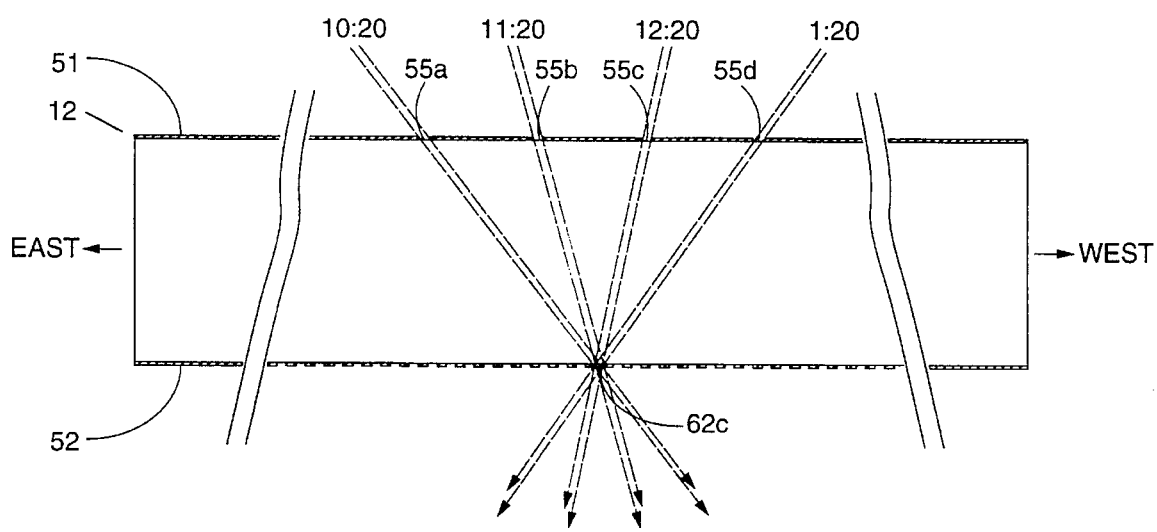

As shown in cross sectional views of FIGS. 9(a) and 9(b) of the common interval panel section 12, a representative portion of stylus slits 255, e.g., stylus slits 55a–55d, cooperate in common angular aspect, element for element, with stencil segment elements 62a–62d of a given horological stencil set, e.g., set 62. This is illustrated in FIG. 9(a) by a portion of sunbeams cooperatively cast, at a given time, through common interval hourly panel section 12 by stylus slit-stencil segment element opening pairs 55a–62a, 55b–62b, 55c–62c, and 55d–62d. The stencil segment element openings of the stencil surface layer elements of the common internal panel section 12 are positioned in a "modified linear approximation to the law of tangents", wherein the linear approximation refers to the small angle approximation of the law of tangents, including a factor for Snell's law of refraction and wherein the modification involves application of an additional scaling term for error distribution.

Although the above-discussed "tangential equations" will yield a singular and precise position and opening size for each stencil segment, the modified linear approximation to the law of tangents is more appropriate for numbers or symbols which repeat every hour.

Since the stylus slits are evenly spaced, a sunbeam from one stylus slit can extend beyond its normal limits and be cast into the stencil segment element openings of another stylus slit-stencil segment domain. This phenomenon is called aliasing, and occurs in many periodic structures. Since the tangential equations only work for the principal domain of stylus-stencil segment pairing, there is a need to space the stencil segments to receive sunbeams from a plurality of stylus slits.

A spacing of the stencil segments following the modified linear approximation to the law of tangents is chosen for the preferred embodiment. An error distribution factor, similar in function to the Chebychev coefficient for redistributing error in polynomials is spatially realized by scaling the position of the stencil segment position with an optimization factor.

The modified linear approximation to the law of tangents for determining the position of the stencil segment element opening Let X=Optimization scaling factor (nearly=1.0)

Then $Er=-L \cdot U \cdot X \cdot (Hr+S/2)-W/2$ (rising edge)

$Es=-L \cdot U \cdot X \cdot (Hs-S/2)+W/2$ (setting edge)

Note that the angular units for Hr, Hs, and S must be radians. The ability to use the optimization scaling factor dramatically improves the time accuracy of the sundial, and can be empirically determined.

By means of the above construction, the representative collective cooperation between the stylus slits 55 and stencil segment element openings of horological stencil set 62 casts the horological silhouette "20" (from 20 up to but not including 30 after the hour). Furthermore, common interval panel section 12 in cooperation with hourly panel section 11 casts the combined horological silhouettes "10 20", representing the commonly displayed time 10:20 o'clock AM of local solar time, for a period of approximately 10 minutes.

It is evident from FIG. 9(b) that common interval panel section 12 comprises stencil segment element openings that cooperate with a plurality of stylus slits, each at a different aspect angle, as illustrated by the representative cooperation of stencil segment element 62c with stylus elements 55a–55d. In the embodiment, the collimation of sunbeams between stylus slits and stencil segment elements occurs approximately at hourly intervals during the gnomon body time domain.

It is to be understood that regulation of sunbeams between successive stylus slits and a cooperative stencil segment element opening cannot satisfy the law of tangents for all aspect angles, and therefore cannot precisely regulate sunbeams at uniform periods of time for repetitively casting a horological silhouette. However, a modified linear approximation to the law of tangents closely approximates the tangential aspect of geometry between each stencil segment element opening and a cooperative plurality of stylus slits which approximation is provided, in part, by applying the law of small angles to the law of tangents for determining the position of stencil segment element openings with respect to the stylus slit-cast sunbeams at the moment of the first ray and last ray of the common interval. However, it is an embodiment of this invention to provide more precise timing of the casting of silhouettes than can be obtained by the direct application of the small angle approximation alone.

Figure 10:
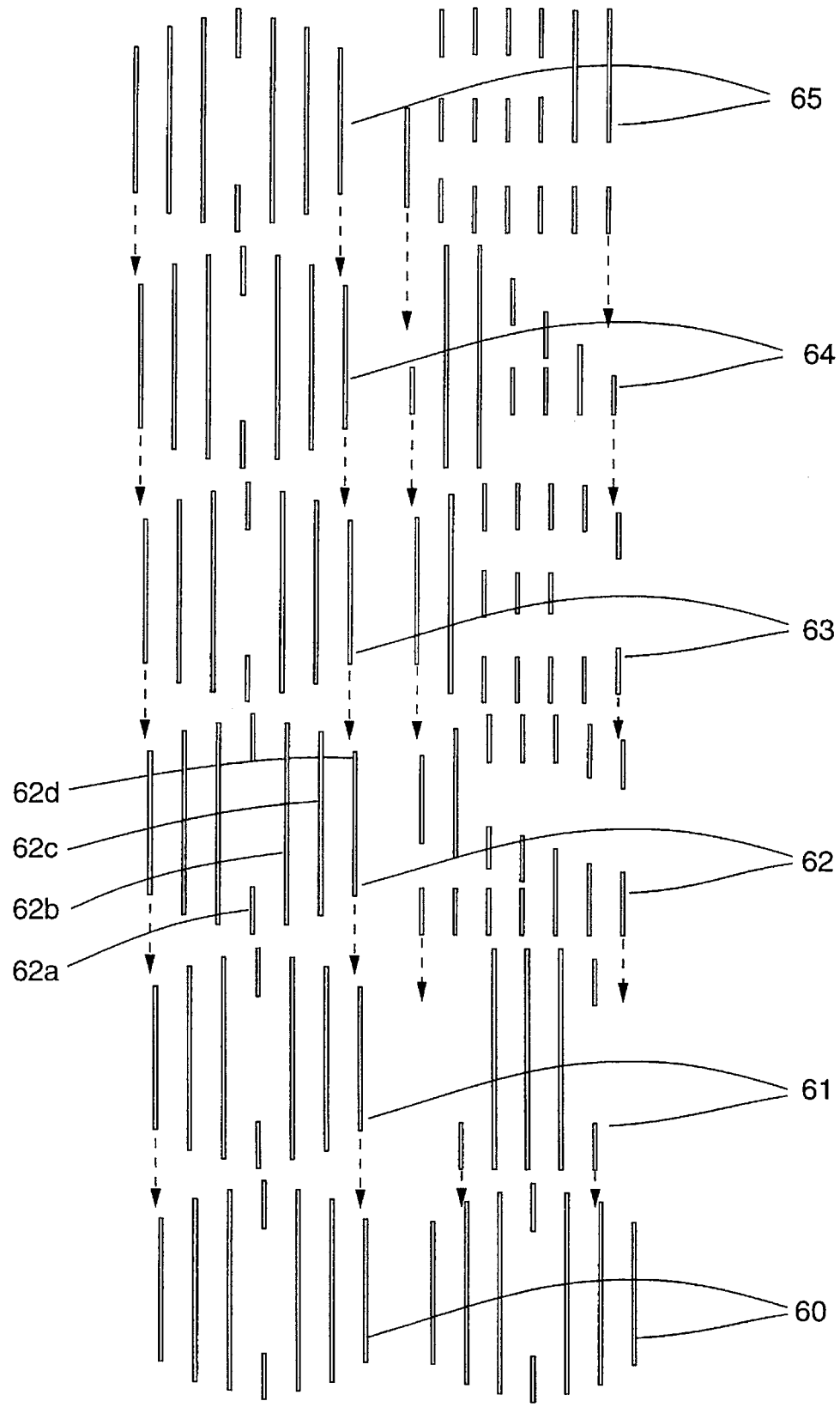
FIG. 10 is a schematic and exploded view of the horological stencil sets of the opposing stencil surface layer element of the common interval panel selection of the gnomon body of FIG. 2.
Figure 11:
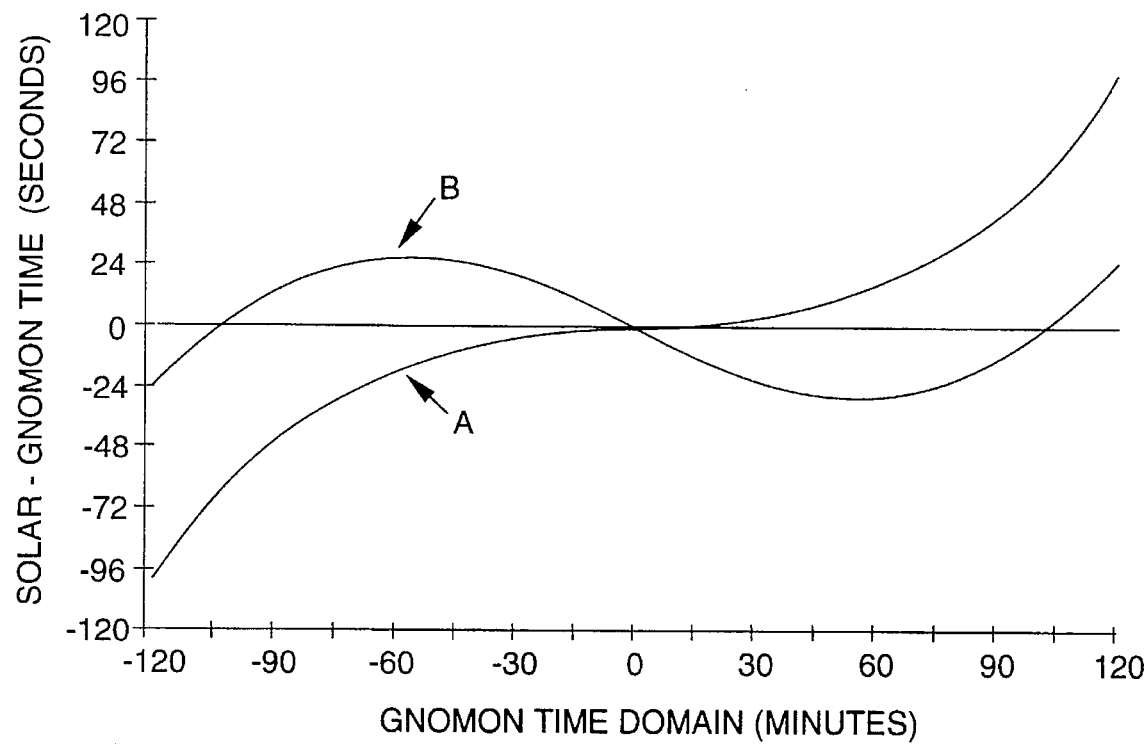
FIG. 11 is a graph showing time accuracy using a modified and unmodified small angle linear approximation.

As is known from mathematics, the small angle approximation, exemplified by the aspect angle of sunbeams cast by the stylus slit multiplied by the distance between sunward and opposing stencil surface layers elements 51 and 52, deviates from the true tangent geometry of the same elements as the aspect angle increases. Therefore, the stencil segment element openings of opposing stencil surface layer element 52 are provided with a position altered by that indicated from the small angle approximation by the application of a constant scaling factor having a value near, but greater than unity, thereby increasing the stencil segment element opening positions. It is to be understood that the scaling factor is strategically selected whereby stencil segment element opening positions are overestimated for small solar angles with respect to the principal axis 14, and underestimated for large angles, in such a manner that the time error is distributed throughout the time domain of the gnomon. For a preferred embodiment of a gnomon body having a time domain of four hours, and a gnomon body material (401,501) of clear acrylic plastic, the envelope of time error of the stylus slits cooperating with stencil segment element openings of FIG. 10 is illustrated in FIG. 11. FIG. 11 shows time error line A of stencil segment element opening size and position provided only by the small angle determination, and time error line B, whereby a scaling factor is provided to the small angle approximation for stencil segment element positioning, thereby reducing the difference between desired solar time of casting a stencil silhouette and actual time to approximately 24 seconds.

Figure 12:
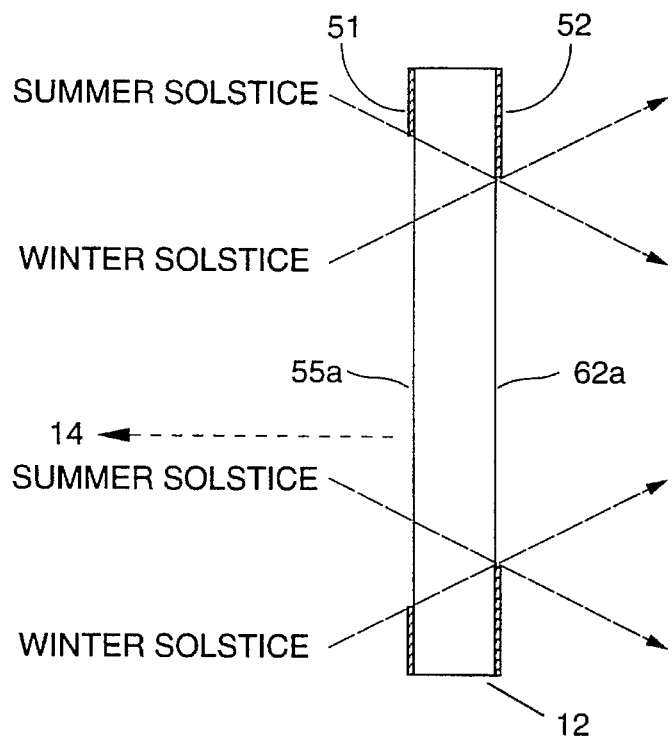
FIG. 12 is a longitudinal cross sectional view of the common interval section panel.

FIG. 12 illustrates a representative stylus slit 55a and stencil segment element opening 62a of the common interval panel section 12. The stylus slit 55a is provided with a length sufficient to accommodate the casting of the extreme solar rays of both summer and winter solstice to be completely received by the stencil segment element opening 62a without vignetting of any solar rays. This geometry applies to all cooperating stylus slit and stencil segment element openings of the hourly panel section 11 and common interval panel section 12.

Second Embodiment

Figure 14:
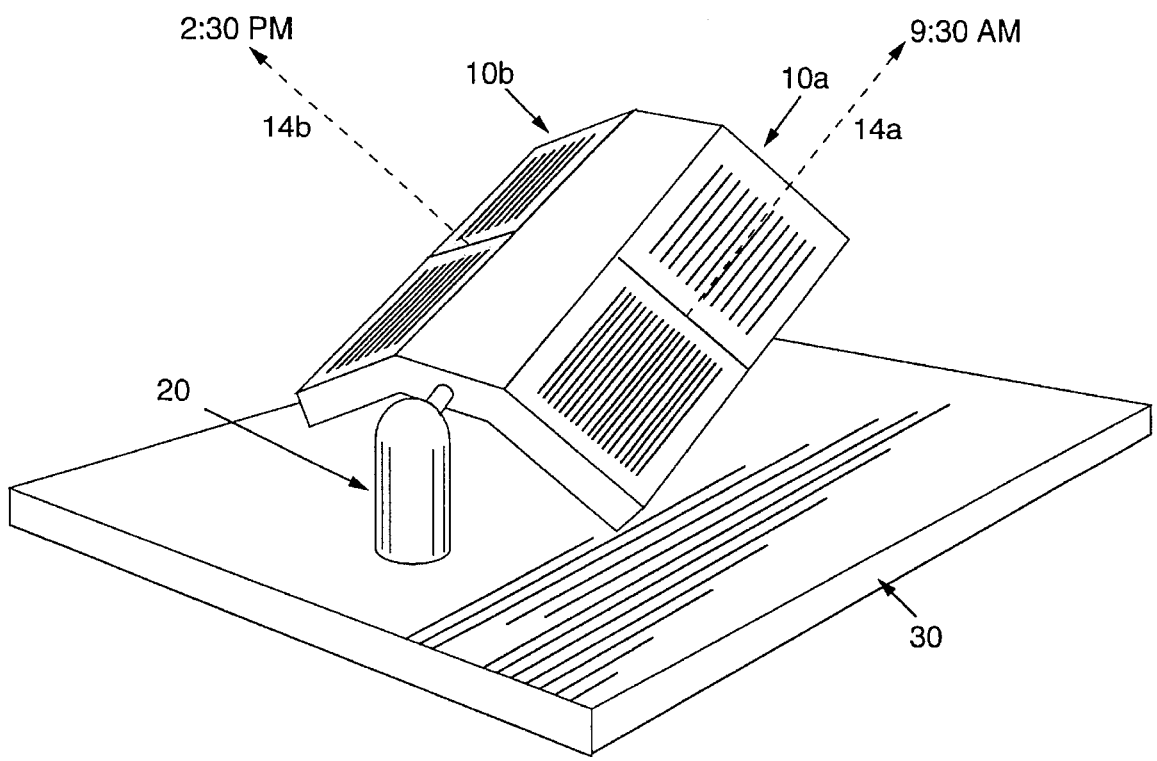
FIG. 14 is a perspective view of a digital sundial in accordance with a second embodiment of the invention.

A second embodiment of the present invention is exemplified by a digital sundial illustrated in FIG. 14, which comprises two gnomon bodies: a morning gnomon body 10a and an afternoon gnomon body 10b. The time domain of this digital sundial comprises 7 AM–12 PM and 12 PM–5 PM, local solar time, respectively from gnomon bodies 10a and 10b. Each gnomon body is constructed along the lines of gnomon body 10 from the first embodiment. The principal axis 14a of the morning gnomon body 10a is aligned on the celestial equator toward the 9:30 AM local solar hour angle, and the principal axis 14b of the afternoon gnomon body 10b is aligned on the celestial equator toward the 2:30 PM local solar hour angle.

The opposing stencil surface element layer of the hourly panel section of morning gnomon body 10a preferably comprises the horological stencil sets of Arabic numbers "7", "8", "9", "10", and "11". The opposing stencil surface element layer of the hourly panel section of the afternoon gnomon body 10b preferably comprises the horological stencil sets of symbols "12", "1", "2", "3", and "4".

Third Embodiment

Figure 15:
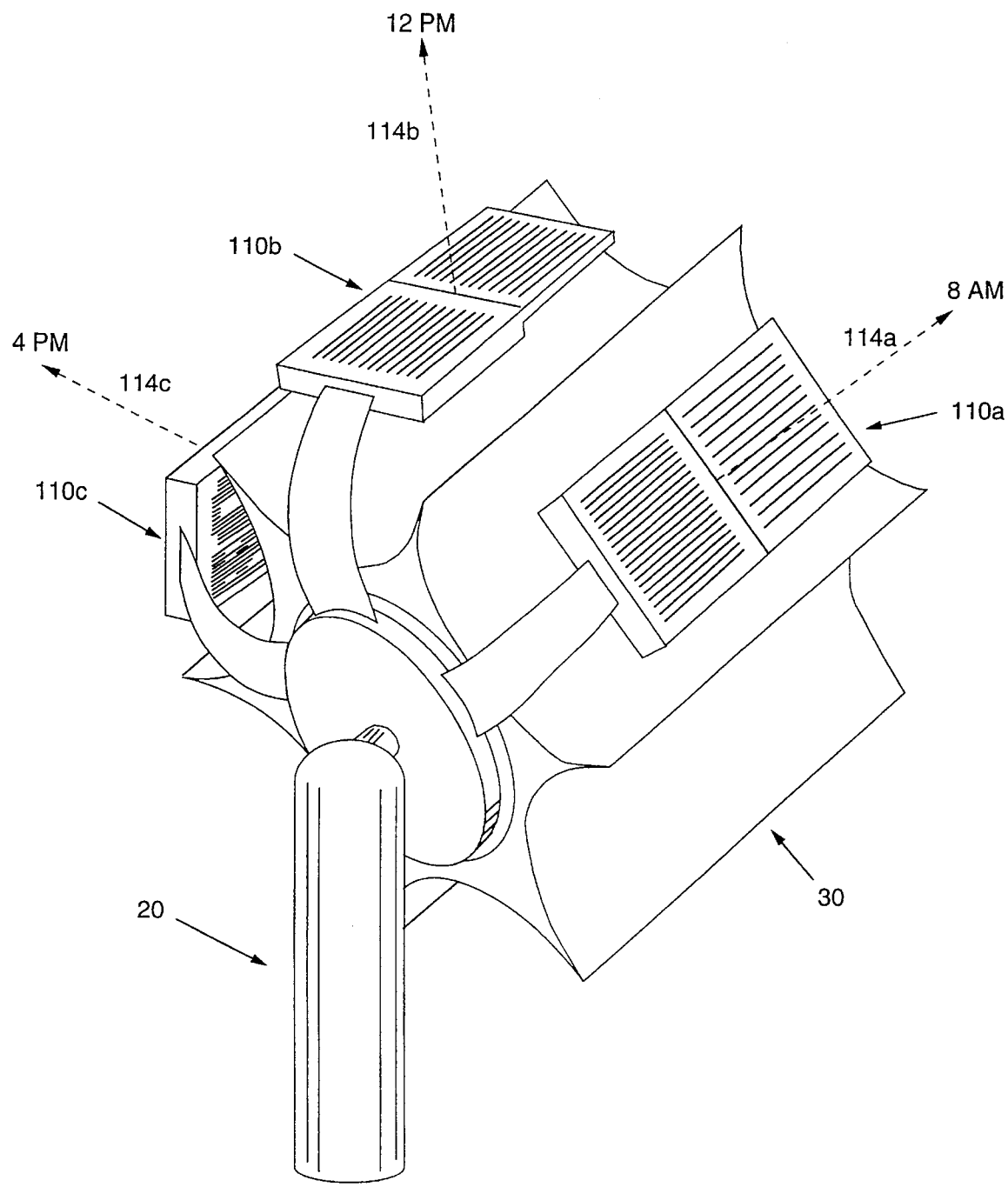
FIG. 15 is a perspective view of a digital sundial in accordance with a third embodiment of the invention.

A third embodiment of the present invention is exemplified by a digital sundial comprising three gnomon bodies 110a–110c as illustrated in FIG. 15. Each gnomon body is constructed along the lines of gnomon body 10 from the first embodiment. The time domain of the sundial comprises 6 AM–10 AM, 10 AM–2 PM, and 2 PM–6 PM, and the principal axes 114a, 114b, and 114c of gnomon bodies 110a, 110b, and 110c, respectively, are aligned on the celestial equator toward the 8 AM, noon, and 4 PM local hour angles respectively. In this embodiment, the time domains of gnomon bodies 110a, 110b, and 110c, respectively comprise 6 AM–10 AM, 10 AM–2 PM, and 2 PM–6 PM. The opposing stencil surface element layer of the hourly panel section preferably comprises the horological stencil sets "6", "7", "8", and "9", "10", "11", "12", and "1", and "2", "3", "4", and "5" for the morning (110a), mid-day (110b), and afternoon (110c) gnomon bodies, respectively.

Alternate Configurations

For each of the above-discussed embodiments, it is possible to reverse the order of the layers. In particular, the opposing stencil surface layer element may be disposed facing the sun, whilst the sunward stylus surface layer element may be positioned beneath the opposing stencil layer element. By the "law of reciprocity", the sunbeams passing through the stencil surface layer element, and thereafter through the stylus surface layer element, will cooperate to cast the same horological silhouettes as in the above embodiments.

Furthermore, the above embodiments are not limited to arabic numerals, but may instead display Roman, Hebrew, Sanskrit, Mayan, or any other symbol to indicate the passing of time.

While the present invention has been described with respect to what presently are considered to be preferred embodiments, it is to be understood that the invention is not limited to the disclosed embodiments. To the contrary, the present invention is intended to cover various modifications and equivalent arrangements included with the spirit and scope of the appended claims. The following claims are to be accorded a broad interpretation, so as to encompass all such modifications and equivalent structures and functions.

What is claimed is:

1. A sundial gnomon comprising:

a first surface having a plurality of parallel first surface apertures transmissive to light and through which a plurality of sunbeams pass; and a second surface having a plurality of second surface segment apertures for regulating the passage of sunbeams passing through said plurality of first surface apertures, said plurality of second surface segment apertures being arranged in a plurality of patterns, each said pattern including a plurality of second surface segment apertures, the plurality of second surface segment apertures being configured to cause sunbeams passing through said plurality of first surface apertures to be incident upon said second surface segment apertures of only one said pattern at a given time.

2. A sundial gnomon according to claim 1, wherein when second surface segment apertures of a pattern are illuminated by sunbeams from the plurality of first surface apertures, aspect angles between each second surface segment aperture of the pattern and a respective one of said plurality of first surface apertures which illuminates the second surface segment aperture, are the same.

3. A sundial gnomon according to claim 2, wherein when said second surface segment apertures of a pattern are illuminated by sunbeams from the plurality of first surface apertures, each second surface segment aperture of the stencil pattern is illuminated by a respective one of the plurality of first surface apertures, and each said second surface segment aperture is configured, in accordance with the law of tangents, to be illuminated only during a single period during the course of a day by the respective first surface aperture.

4. A sundial gnomon according to claim 3, further comprising a light-transmissive medium disposed between said first surface and said second surface, wherein the following relationships are satisfied for each said second surface aperture and said respective first surface aperture, whereby each second surface aperture is illuminated only during a single period of time during the course of a day:

$Ar = -\arcsin(U \cdot \sin(Hr+S/2))$, $As = -\arcsin(U \cdot \sin(Hs-S/2))$, $Er = L \cdot \tan(Ar) - W/2$, and $Es = L \cdot \tan(As) + W/2$, wherein W is a width of said respective first surface aperture, Hr is the local hour angle of the sun with respect to a principal axis of said sundial gnomon at which the sunlight passes through said respective first surface aperture and begins to illuminate said second surface aperture, Hs is the local hour angle of the sun with respect to the principal axis of said sundial gnomon at which sunlight passes through said respective first surface aperture and ceases to illuminate said second surface aperture, S is the angular diameter of the sun, L is a distance between said first surface and said second surface, U is the reciprocal of an index of refraction of said gnomon body material, and As and Ar are respectively the interior angles with respect to a principal axis at which the sunlight begins and ceases to illuminate said second surface aperature, Er and Es are respective coordinates of opposing sides of said second surface aperture with respect to a point on said second surface laterally coincident with a center of said respective first surface aperture.

5. A sundial gnomon according to claim 2, wherein when said second surface segment apertures of a pattern are illuminated by sunbeams from the plurality of said first surface apertures, each illuminated second surface segment aperture of the illuminated pattern is illuminated by a respective one of the plurality of first surface apertures, and each illuminated second surface segment aperture is positioned in accordance with a modified linear relationship which is an approximation to the law of tangents, said relationship including a scaled law of small angles, the scaling including a distribution of time errors.

6. A sundial gnomon according to claim 5, further comprising a light-transmissive medium disposed between said first surface and said second surface, wherein the following relationships are satisfied for each illuminated second surface aperture and the respective first surface aperture, whereby each illuminated second surface aperture is illuminated during a plurality of periods during the course of a day:

$$Er = -L \cdot U \cdot X \cdot (Hr + S/2) - W/2$$

$$Es = -L \cdot U \cdot X \cdot (Hs - S/2) + W/2$$

wherein

W is a width of said respective first surface aperture,

Hr is the local hour angle of the sun with respect to a principal axis of said sundial gnomon at which the sunlight passes through said respective first surface aperture and begins to illuminate said second surface aperture, Hs is the local hour angle of the sun with respect to the principal axis of said sundial gnomon at which sunlight passes through said respective first surface aperture and ceases to illuminate said second surface aperture, S is the angular diameter of the sun, L is a distance between said first surface and said second surface, U is the reciprocal of an index of refraction of the gnomon body material, X is a scaling constant of near unity, and Er and Es are respective coordinates of opposing sides of said second surface aperture with respect to a point on said second surface laterally coincident with a center of said respective first surface aperture.

7. A sundial gnomon comprising:

a first surface having a plurality of parallel apertures transmissive to light and through which sunlight passes; and a second surface which receives sunlight from said first surface apertures, said second surface having at least two patterns of parallel aperture elements regulating passage of sunlight, a first pattern including a plurality of second surface aperture elements which form a pattern illuminated during only one period of a day and which are configured in accordance with the law of tangents, a second pattern including a further plurality of second surface aperture elements which form a pattern illuminated repetitively by successive first surface apertures and which are configured in accordance with a modified linear small angle approximation to the law of tangents, the modification including application of a scaling factor for Chebychev error equalization.

8. A sundial gnomon according to claim 7, further comprising a light-transmissive medium disposed between said first surface and said second surface, said medium having an index of refraction greater than 1.

9. A gnomon body according to claim 7, further comprising a translucent material disposed within each said second surface aperture.

10. A sundial, comprising:

collimating means for collimating incident sunlight into a plurality of light beams;

light-beam-pattern-creating means for transforming light beams from said collimating means to create a light beam pattern including at least one first pattern displayed only for a single period of time during the course of a day and at least one second pattern repetitively displayed during a respective plurality of periods during the course of a day, said light-beam-pattern-creating means comprising a plurality of parallel slits.

11. A sundial according to claim 10, wherein said light-beam-pattern-creating means comprises means for displaying a second pattern for a period of time less than the period of time during which said first pattern is displayed.

12. A sundial according to claim 10, wherein said light-beam-pattern-creating means comprises means for redistributing error in a starting time and an ending time at which each said second pattern is displayed.

13. A sundial according to claim 12, wherein said light-beam-pattern-creating means comprises means for modifying a distance between said collimating means and said light-beam-pattern-creating means.

14. A gnomon body according to claim 10, wherein said light-beam-pattern-creating means comprises means for creating a first pattern representative of the hour of the day, and a second pattern representative of a subdivision of an hour.

15. A sundial comprising:

at least one gnomon body including (a) an opaque sunward surface having a plurality of surface apertures transparent to light and through which sunlight passes; and (b) an opaque opposing and regulating surface parallel to said sunward surface and which receives sunlight passing through said plurality of sunward surface apertures, said opposing and regulating surface having a plurality of regulating surface apertures transparent to light, said plurality of regulating surface apertures including (i) at least one first pattern including a plurality of regulating surface apertures arranged in accordance with the law of tangents with respect to the plurality of sunward surface apertures to pass sunlight passed from said sunward surface to create a light pattern to be displayed only during a single period during the course of a day and (ii) at least one second pattern including a plurality of regulating surface apertures arranged in accordance with a modified linear approximation to the law of tangents with respect to the plurality of sunward surface apertures, the linear approximation including the law of small angles, and the modification including application of a scaling factor with the law of small angles modified by a scaling factor in accordance with Chebychev-like error equalization to create a light pattern to be repetitively displayed during a corresponding plurality of periods during the course of a day.

16. A sundial according to claim 15, further comprising a plurality of said gnomon bodies, each said gnomon body being aligned to a different solar meridian.

17. A sundial according to claim 15, wherein when regulating surface apertures of a first pattern are illuminated by sunbeams from the plurality of sunward surface apertures, each regulating surface aperture of the illuminated pattern is illuminated by a respective one of the plurality of sunward surface apertures, and each said regulating surface aperture is configured, in accordance with the law of tangents, to be illuminated only during a single period during the course of a day by the respective sunward surface aperture, and wherein said sundial further comprises a light-transmissive medium disposed between said sunward surface and said regulating surface, wherein the following relationships are satisfied for each regulating surface aperture and said respective sunward surface aperture, whereby each regulating surface aperture is illuminated only during a single period of time during the course of a day:

$$Ar = -\arcsin(U \cdot \sin(Hr + S/2)),$$

$$As = -\arcsin(U \cdot \sin(Hs - S/2)),$$

$$Er = L \cdot \tan(Ar) - W/2, \text{ and}$$

$$Es = L \cdot \tan(As) + W/2,$$

wherein

W is a width of said respective sunward surface aperture,

Hr is the local hour angle of the sun with respect to a principal axis of said sundial gnomon at which the sunlight passes through said respective sunward surface aperture and begins to illuminate said regulating surface aperture, Hs is the local hour angle of the sun with respect to the principal axis of said sundial gnomon at which sunlight passes through said respective sunward surface aperture and ceases to illuminate said regulating surface aperture, S is the angular diameter of the sun, L is a distance between said sunward surface and said regulating surface, U is the reciprocal of an index of refraction of said material, and As and Ar are respectively the interior angles with respect to a principal axis at which the sunlight begins and ceases to illuminate said second surface aperature, Er and Es are respective coordinates of opposing sides of said regulating surface aperture with respect to a point on said regulating surface laterally coincident with a center of said respective grill surface aperture.

18. A sundial according to claim 17, wherein the index of refraction of said medium is greater than one.

19. A sundial according to claim 15, wherein when said regulating surface apertures of a second pattern are illuminated by sunbeams from a plurality of sunward surface apertures, each illuminated regulating surface aperture of the illuminated pattern is illuminated by a respective one of the plurality of sunward surface apertures, and each illuminated regulating surface aperture is configured in accordance with a modified linear relationship which is an approximation to the law of tangents, said relationship including a scaled law of small angles, the scaling providing for a distribution of time errors, and wherein said sundial further comprises a light-transmissive medium disposed between said sunward surface and said regulating surface, wherein the following relationships are satisfied for each illuminated regulating surface aperture and the respective sunward surface aperture, whereby each illuminated regulating surface aperture is illuminated during a plurality of periods during the course of a day:

$$Er = -L \cdot U \cdot X \cdot (Hr + S/2) - W/2$$

$$Es = -L \cdot U \cdot X \cdot (Hs - S/2) + W/2$$

wherein

W is a width of said respective sunward surface aperture,

Hr is the local hour angle of the sun with respect to a principal axis of said sundial gnomon at which the sunlight passes through said respective sunward surface aperture and begins to illuminate said regulating surface aperture, Hs is the local hour angle of the sun with respect to the principal axis of said sundial gnomon at which sunlight passes through said respective sunward surface aperture and ceases to illuminate said regulating surface aperture, S is the angular diameter of the sun, L is a distance between said sunward surface and said regulating surface, U is the reciprocal of an index of refraction of said material, X is a scaling constant of near unity, and Er and Es are respective coordinates of opposing sides of said regulating surface aperture with respect to a point on said regulating surface laterally coincident with a center of said respective sunward surface aperture.

20. A sundial according to claim 19, wherein the index of refraction of said medium is greater than one.

21. A sundial according to claim 19, wherein positions of said opaque sunward surface and said opaque regulating surface are reversed.

* * * * *

UNITED STATES PATENT AND TRADEMARK OFFICE
CERTIFICATE OF CORRECTION

PATENT NO.  : 5,596,553                    Page 1 of 2
DATED       : January 21, 1997
INVENTOR(S) : ROBERT L. KELLOGG It is certified that error appears in the above-identified patent and that said Letters Patent is hereby corrected as shown below:

Title page, item
[56] References Cited

U.S. Patent Documents

"Glenoinning" should read --Glendinning--.

COLUMN 9

Line 49, "with" should read --within--.

COLUMN 11

Line 59, "gnomon body" should read --sundial gnomon--.

COLUMN 12

Line 18, "gnomon body" should read --sundial--.

UNITED STATES PATENT AND TRADEMARK OFFICE
CERTIFICATE OF CORRECTION

PATENT NO. : 5,596,553
DATED : January 21, 1997
INVENTOR(S) : ROBERT L. KELLOGG

It is certified that error appears in the above-identified patent and that said Letters Patent is hereby corrected as shown below:

COLUMN 13

Line 32, "aperature," should read --aperture,--.

Line 32, "second" should read --regulating--.

Line 36, "grill" should read --sunward--.

Signed and Sealed this

Second Day of June, 1998

*Attest:*

BRUCE LEHMAN

*Attesting Officer*    *Commissioner of Patents and Trademarks*